(12) United States Patent
Torii et al.

(10) Patent No.: US 7,789,066 B2
(45) Date of Patent: Sep. 7, 2010

(54) VALVE ASSEMBLY HAVING A SEALING MEMBER

(75) Inventors: Katsuya Torii, Anjo (JP); Yasushi Kawano, Anjo (JP); Masamichi Akagawa, Kariya (JP)

(73) Assignee: Denso Corporation, Kariya (JP)

( * ) Notice: Subject to any disclaimer, the term of this patent is extended or adjusted under 35 U.S.C. 154(b) by 654 days.

(21) Appl. No.: 11/643,981

(22) Filed: Dec. 22, 2006

(65) Prior Publication Data
US 2007/0144483 A1 Jun. 28, 2007

(30) Foreign Application Priority Data
Dec. 26, 2005 (JP) .............. 2005-372210

(51) Int. Cl.
F02M 35/10 (2006.01)
F02D 9/08 (2006.01)

(52) U.S. Cl. .................. 123/336; 123/337

(58) Field of Classification Search ........ 123/336, 123/337, 184.53, 184.61; 251/305, 308
See application file for complete search history.

(56) References Cited

U.S. PATENT DOCUMENTS

| | | | |
|---|---|---|---|
| 4,794,886 A * | 1/1989 | Iwamuro et al. | 123/184.49 |
| 6,427,975 B1 | 8/2002 | Powell | |
| 6,979,130 B1 | 12/2005 | Stangier et al. | |
| 7,121,246 B2 | 10/2006 | Uchiyama | |
| 7,341,036 B2 * | 3/2008 | Akagawa | 123/336 |
| 2007/0028891 A1 | 2/2007 | Akagawa | |
| 2007/0138693 A1 | 6/2007 | Torii et al. | |

FOREIGN PATENT DOCUMENTS

| | | | |
|---|---|---|---|
| JP | 9-189270 | | 7/1997 |
| JP | 10-259768 | | 9/1998 |
| JP | 2002-21656 A | * | 1/2002 |
| JP | 2004-285893 | | 10/2004 |
| JP | 2007-40282 A | | 2/2007 |
| JP | 2007-46470 A | | 2/2007 |

OTHER PUBLICATIONS

U.S. Appl. No. 11/498,201, filed Aug. 2006, Akagawa.
Japanese Office Action dated Mar. 30, 2010, issued in corresponding Japanese Application No. 2005-372210, with English translation.

* cited by examiner

*Primary Examiner*—Hieu T Vo
(74) *Attorney, Agent, or Firm*—Nixon & Vanderhye PC (57) ABSTRACT

A valve assembly is disclosed that includes a first and a second valve assembly parts that collectively define a duct. The valve assembly also includes a valve unit that includes a housing defining a fluid flow path therethrough. The valve unit is coupled to the first valve assembly part such that the fluid flow path is in fluid communication with the duct. A control valve is also included for controlling flow of fluid in the flow path. Furthermore, the valve assembly includes a sealing member that seals a space between the first valve assembly part and the second valve assembly part, that seals a space between the first valve assembly part and the valve unit, and that dampens vibration transmitted to the valve unit.

18 Claims, 6 Drawing Sheets

VALVE ASSEMBLY HAVING A SEALING MEMBER

CROSS-REFERENCE TO RELATED APPLICATION

This application is based on and claims priority to Japanese Patent Application No. 2005-372210 filed on Dec. 26, 2005, the disclosure of which is incorporated herein by reference.

FIELD

The following relates to a valve assembly and, more specifically, relates to a valve assembly having a sealing member.

BACKGROUND

It is known to provide a valve assembly for controlling flow through a flow passage. For instance, in a prior art intake device for an internal combustion engine, a valve assembly is included with an intake air quantity control valve such as a throttle valve or the like. The valve opens and closes therein and is fitted to a downstream end side of an air duct. An outlet port side of the throttle body is coupled to an upstream end side of an intake manifold. Also, a first sealing member such as a first gasket is provided for sealing the space between the throttle valve and the air duct, and a second sealing member such as a second gasket is installed for sealing the space between the throttle body and the intake manifold. For example, Japanese Patent Publication No. 10-259768A discloses such a valve assembly.

However, in the case of the valve assembly disclosed in Japanese Patent Publication No. 10-259768A, the first gasket and the second gasket are separate sealing members. As such, the valve assembly is overly complicated and the manufacturing costs are relatively high.

Figure 8:
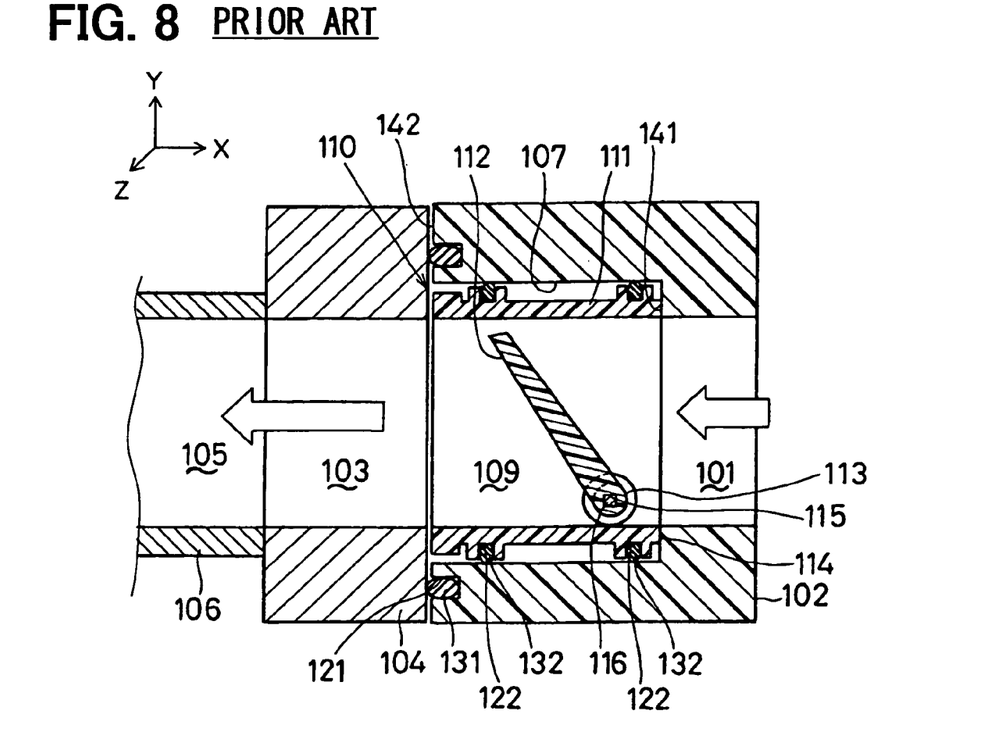
FIG. 8 is a cross sectional view of a valve assembly of the prior art.

For instance, the present applicant has filed Japanese Patent Application No. 2005-228675 (filed Aug. 8, 2005, hereinafter referred to as "comparative example 1"). This application discloses an intake manifold in an intake duct of an internal combustion engine. A flow of intake air inducted into each cylinder of the engine is switched corresponding to an operating condition of the engine to thereby improve a combustion condition and engine performance. The intake device for the engine of this comparative example 1, as shown in FIG. 8, comprises an intake duct that supplies inducted air (i.e., intake air) into a combustion chamber of the engine. The intake duct includes an intake manifold 102 that defines an intake passage 101, a head cover 104 that defines an intake passage 103, and a cylinder head 106 that defines an intake air port 105 and that communicates with a combustion chamber.

A valve unit 110 is also provided the intake manifold 102. The valve unit 110 includes a housing 111, which is disposed in a fitting hole 107 formed in the intake manifold 102. The valve unit 110 also includes an intake control valve 112, which rotates relative to the housing 111 to open and close an airflow path 109. Furthermore, the valve unit 110 includes a valve shaft 113 having a center of rotation at opposite sides of the intake control valve 112. The valve shaft 113 is formed integrally with the intake control valve 112 and is rotationally supported by respective side walls of the housing 111 via bearings (not shown). Airflow through the airflow path 109 is indicated in FIG. 8 by arrows.

A first gasket 131 is provided between a first annular recessed part 121 formed at the downstream end surface of the intake manifold 102 and the upstream end surface of a head cover 104. The first gasket 131 seals the gap formed between the intake manifold 102 and the head cover 104. Also, a plurality of second gaskets 132 is provided between the inner wall of the fitting hole 107 of the intake manifold 102 and the outer wall of the housing 111 of the valve unit 110. More specifically, the second gaskets 132 are provided in second annular recessed parts 122 formed at the outside wall surface of the housing 111 of the valve unit 110, are inserted two second gaskets 132. The second gaskets 132 seal the gap formed between the intake manifold 102 and the housing 111 of the valve unit 110.

Engine vibration is transmitted to the valve unit 110 via the head cover 104 and the intake manifold 102. There is a possibility that the valve unit 110 in the interior of the fitting hole 107 of the intake manifold 102 can vibrate in a direction transverse to the axis of the flow path 109 (i.e., in the Y-direction and/or Z-direction indicated in FIG. 8). Thus, to dampen this vibration, the two second gaskets 132 are arranged to encompass the housing 111 of the valve unit 110.

The valve unit 110 has a contact surface 114 that abuts against the control surface 141 (i.e., X-direction alignment surface) of the intake manifold 102 at the upstream side of the housing 111. Also, the position of the valve unit 110 in a direction transverse to the axis of the airflow path 109 is determined by sealing position of the second gaskets 132.

However, in the intake device for the engine of the comparative example 1, similar to the intake device disclosed in Japanese Patent Publication No. 10-259768A, the first and second gaskets 131, 132 are separate members. As such, the seal structure of the intake device is overly complicated, and the manufacturing costs are relatively high.

Moreover, a reaction force is applied from the intake manifold 102 through the second gaskets 132 to the housing 111, and the reaction force can deform the housing 111. As such, the gap between the housing 111 and the intake control valve 112 may be insufficient for ensuring proper rotation of the intake control valve 112.

Also, the engine head cover 104 is, for example, a cast metal article such as aluminum die-cast or the like, and has an upstream side end surface for attaching to the intake manifold 102. Typically, this upstream side end surface is precision cut to high tolerances. The intake manifold 102 is a resin molded article which is integrally resin molded.

Since the control surface 141 (i.e., X-direction alignment surface) of the intake manifold 102 is spaced relatively far away from the downstream side end surface 142 of the intake manifold 102, the assembly position of the valve member 110 in the direction of the axis of the airflow path 109 (i.e., the X-direction) is relatively imprecise. Accordingly, it may be difficult to align the pivotal center of the valve shaft 113 with through holes in the intake manifold 102. Therefore, after the valve unit 110 has been positioned inside the fitting hole 107 of the intake manifold 102, it may be difficult to insert a shaft 116 from outside the intake manifold 102 through the valve shaft 113 of the valve unit 110. Also, because of an axial deviation of the assembly position of the intake control valve 112 in relation to the intake passage 103 and/or the intake air port 105, engine combustion conditions and/or engine performance can be detrimentally affected.

SUMMARY

A valve assembly is disclosed that includes a first and a second valve assembly parts that collectively define a duct. The valve assembly also includes a valve unit that includes a housing defining a fluid flow path therethrough. The valve unit is coupled to the first valve assembly part such that the fluid flow path is in fluid communication with the duct. A control valve is also included for controlling flow of fluid in the flow path. Furthermore, the valve assembly includes a sealing member that seals a space between the first valve assembly part and the second valve assembly part, that seals a space between the first valve assembly part and the valve unit, and that dampens vibration transmitted to the valve unit.

Furthermore, an intake device for an internal combustion engine is disclosed that includes a first and a second valve assembly parts that collectively define a duct. The intake device also includes a valve unit that includes a housing defining a fluid flow path therethrough. The valve unit is coupled to the first valve assembly part such that the fluid flow path is in fluid communication with the duct. The intake device also includes a control valve for controlling flow of fluid in the flow path. Furthermore, the intake device includes a gasket that seals a space between the first valve assembly part and the second valve assembly part, that seals a space between the first valve assembly part and the valve unit, and that dampens vibration transmitted to the valve unit.

BRIEF DESCRIPTION OF THE DRAWINGS

Other objects, features, and advantages of the present invention will become more apparent from the following detailed description made with reference to the accompanying drawings, in which like portions are designated by like reference numbers and in which.

DETAILED DESCRIPTION OF EXAMPLE EMBODIMENTS

First Embodiment

Referring initially to FIGS. 1 through 5, one embodiment of a valve assembly is shown. In this embodiment, the valve assembly is an intake flow control device (i.e., an intake flow generating device, a swirl generating device) for an internal combustion engine. The intake flow control device can generate an intake swirl (i.e., a tumble flow) in an axial direction for promoting combustion of an air-fuel mixture in each cylinder for a multi-cylinder internal combustion engine (e.g., four-cylinder gasoline engine) of a vehicle such as an automobile. The engine produces heat energy due to combustion of the air-fuel mixture in the combustion chambers. The engine also is provided with an intake duct (i.e., an engine intake pipe) for supplying the intake air (i.e., inducted air) into the combustion chamber in each cylinder and an exhaust duct (i.e., an engine exhaust pipe) for discharging exhaust gas flowing out of the combustion chamber through an exhaust emission purifying device.

Here, the intake duct is provided with an air cleaner case with air cleaner (i.e., a filter element) that filters intake air, a throttle body provided downstream from the air cleaner case, a surge tank provided downstream from throttle body, a dual-pipe structure intake manifold 1 provided downstream from the surge tank, and a head cover 2 coupled to a downstream end surface of manifold 1, and the like.

The intake manifold 1 (i.e., a first valve assembly part) is provided with a plurality of first intake passages 10. In one embodiment, the number of first intake passages 10 corresponds with the number of cylinders in the engine. More specifically, the intake manifold 1 is a multi-branch intake pipe that distributes intake air through the first intake passages 10 to a plurality of intake ports 13 defined in a cylinder head 3 of the engine body. Also, the intake manifold 1 is a block (i.e., an automobile part, an engine part, a resinous intake manifold) that comprises a part of the intake manifold (or the entire body). In one embodiment, the intake manifold 1 is made out of resin material (e.g., glass fiber reinforced thermoplastic resin) and is molded integrally in a generally cube-like shape to thereby reduce weight and manufacturing costs.

Figure 3:
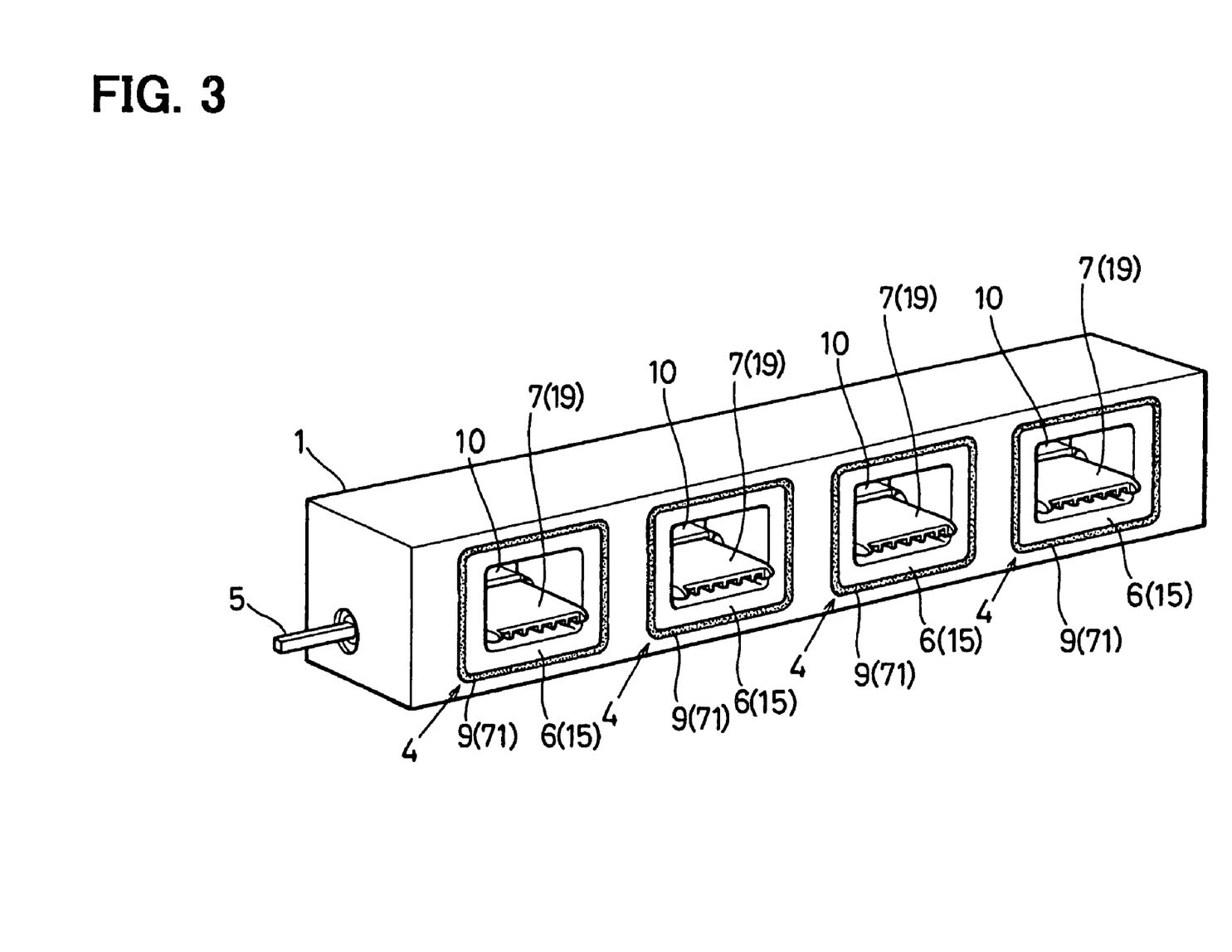
FIG. 3 is a perspective view of the valve assembly of FIG. 1.
Figure 4:
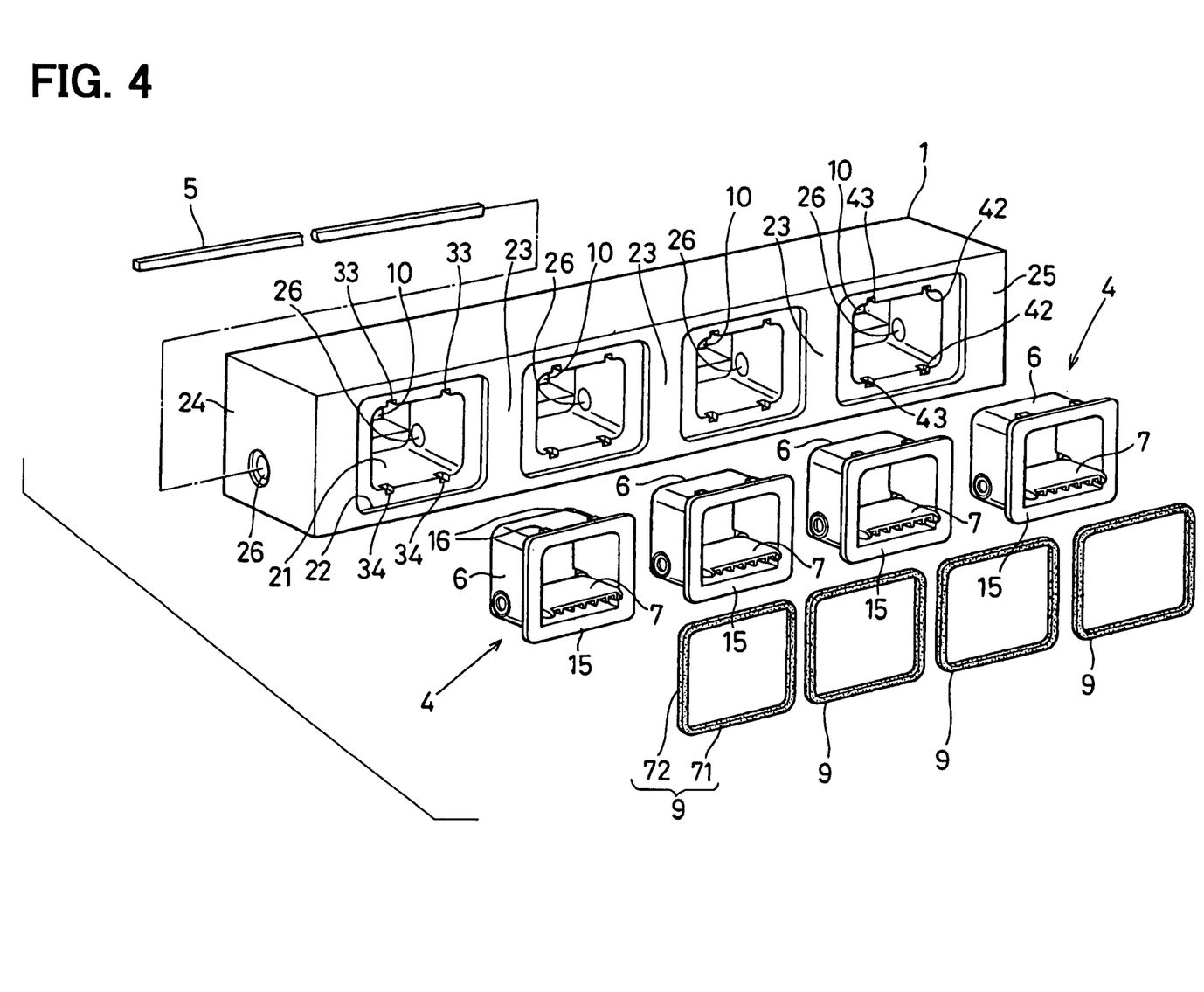
FIG. 4 is an exploded view of the valve assembly of FIG. 1.

The intake manifold 1 of the first embodiment, as shown in FIG. 3 and FIG. 4 is provided with a plurality of fitting holes 21 (valve unit storage part, first to fourth fitting holes) that receive and hold each housing 6 of each of a plurality of valve units 4 (first to fourth valve units). The intake manifold 1 also includes an aperture 22 that receives and holds a sealing member (e.g., a gasket 9) in the space between the corresponding valve unit 4 and a corresponding partitions 23 (see FIG. 4). The gasket 9 air-tightly partitions the two adjoining fitting holes 21.

Furthermore, the intake manifold 1 is provided with a plurality of shaft through holes 26 which are aligned transversely (e.g., perpendicularly) to the axis of the intake passages 10. The axes of the holes 26 extend in the direction from the left wall 24 of the left end as illustrated to the right wall 25 of the right end as illustrated in such a way as to pass through all of the fitting holes 21 and all of the partitions 23. Further, the four corners of each fitting hole 21 and each gasket receiving aperture 22 are rounded (i.e., formed in an arc shape). However, it will be appreciated that the four corners of each fitting hole 21 and each gasket receiving aperture 22 may also be formed in a rectangular shape.

Figure 1:
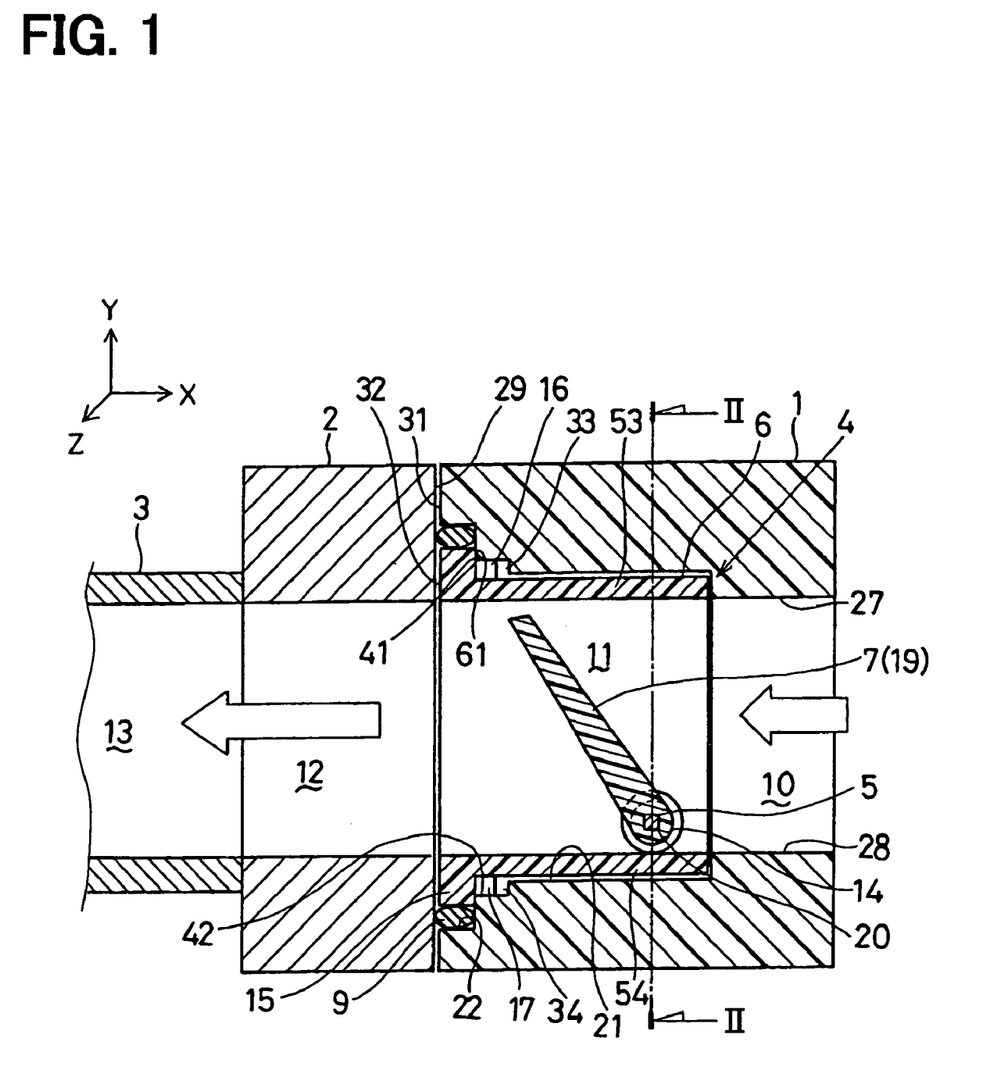
FIG. 1 is a cross sectional view of one embodiment of a valve assembly.

Also, as shown in FIG. 1, the intake manifold 1 includes blocks 27, 28 provided upstream of the fitting holes 21. The blocks 27, 28 are integrally formed (integral resin molding) to the intake manifold 1 and reduce the axial cross sectional area of respective intake passage 10. In one embodiment, the upper end surface (downstream flow path wall surface) of the block 28 is arranged to be co-planar with the intake flow control valve 7 when the intake flow valve 7 is fully opened. Respective open parts (air inlets) of the intake manifold 1 constitute a plurality of first intake passages 10 (first to fourth intake ports) to introduce intake air to the interior (air flow path 11) of the valve units 4.

The intake manifold 1 is disposed so as to be opposed to the upstream side end surface 29 of the head cover 2 and includes a first coupling end surface 31 that couples air-tightly, via the gasket 9, to an upstream side end surface 29 of the head cover 2. Here, each housing 6 of each of the plurality of valve units 4 is provided so as to be opposed to the upstream side end surface 29 of the head cover 2 and includes a second coupling end surface 32 that couples air-tightly, via the gasket 9, to the upstream side end surface 29 of the head cover 2. Also, a part of the upstream side end surface 29 of head cover 2 functions as a first seal surface to which a first seal part (discussed in greater detail below) of the gasket 9 tightly seats. In one embodiment, the upstream side end surface 29 is flat and rectangular shaped (i.e., square shaped).

The intake manifold 1 includes a rectangular shaped first control surface 41 (X-direction control surface) which engages the outside part, or more specifically, the upstream side of the flange 15 of the respective valve unit 4. The first control surface 41 is provided upstream of the first coupling end surface 31 in the axial direction. In other words, the first control surface 41 is stepped in an upstream direction away from the first coupling end surface 31. The outside periphery of the first control surface 41 functions as a first seal surface to which the first seal part (discussed in greater detail below) of the gasket 9 tightly seats. Furthermore, the first control surface 41 is perpendicular to the gasket receiving aperture 22 and the fitting hole 21, and the first control surface 41 is spaced axially away from the upstream side end surface 29 of the head cover 2.

The rectangular (square) gasket receiving aperture 22 is arranged between the first coupling end surface 31 and the first control surface 41. The gasket receiving aperture 22 is arranged downstream from the fitting hole 21. The inside surface of the gasket receiving aperture 22 functions as the second seal surface to which a second seal part (described in greater detail below) is tightly attached.

Also, the intake manifold 1 includes a plurality of female fitting parts 33, 34 (i.e., first fitting parts) (see FIG. 4). In the embodiment shown, the female fitting parts 33, 34 are notches formed in the first control surface 41 and extend generally in the axial direction. Male fitting parts 16, 17 are included on the downstream surface of the flange 15 of the valve unit 4, and the male fitting parts 16, 17 are received in corresponding ones of the female fitting parts 33, 34. The female fitting parts 33, 34 include second and third control surfaces 42, 43 (i.e., a Y-direction control surface and a Z-direction control surface, respectively) for supporting each male fitting part 16, 17 of the valve unit 4.

The engine body comprises a cylinder head 3 which couples air-tightly to the downstream end of the intake duct. The engine body also includes a cylinder block (not shown) in which is formed a cylinder bore. Additionally, at the upper part (and side direction part) of the cylinder head 3 is attached the head cover 2 in which is formed (in a number corresponding to the number of cylinders) a plurality of second intake passages 12. Between the cylinder head 3 and the cylinder block are formed combustion chambers into which the air-fuel mixture is inducted from the intake air port 13 (intake port). The head cover 2 corresponds to a second valve assembly part, and constitutes a part (i.e., the downstream part) of the intake duct which couples air-tightly to the upstream end of cylinder head 3. Furthermore, the head cover 2, the cylinder head 3, and the cylinder block vibrate subject to the effects of heat from combustion. To withstand these conditions the head cover 2, the cylinder head 3, and the cylinder block are robust and are, for instance, made of aluminum die-cast or cast iron.

A spark plug (not shown) is attached to the cylinder head 3 in such a way that a tip end thereof is provided in a respective combustion chamber. An injector (not shown) is attached to the cylinder head 3 and injects fuel into the intake airport 13 at a predetermined timing. Also, a plurality of intake air ports 13 formed at one side of the cylinder head 3 are opened and closed by a poppet type intake air valve (intake valve), and a plurality of exhaust ports formed at the other side of the cylinder head 3 are opened and closed by a poppet type exhaust valve (exhaust valve).

Figure 2:
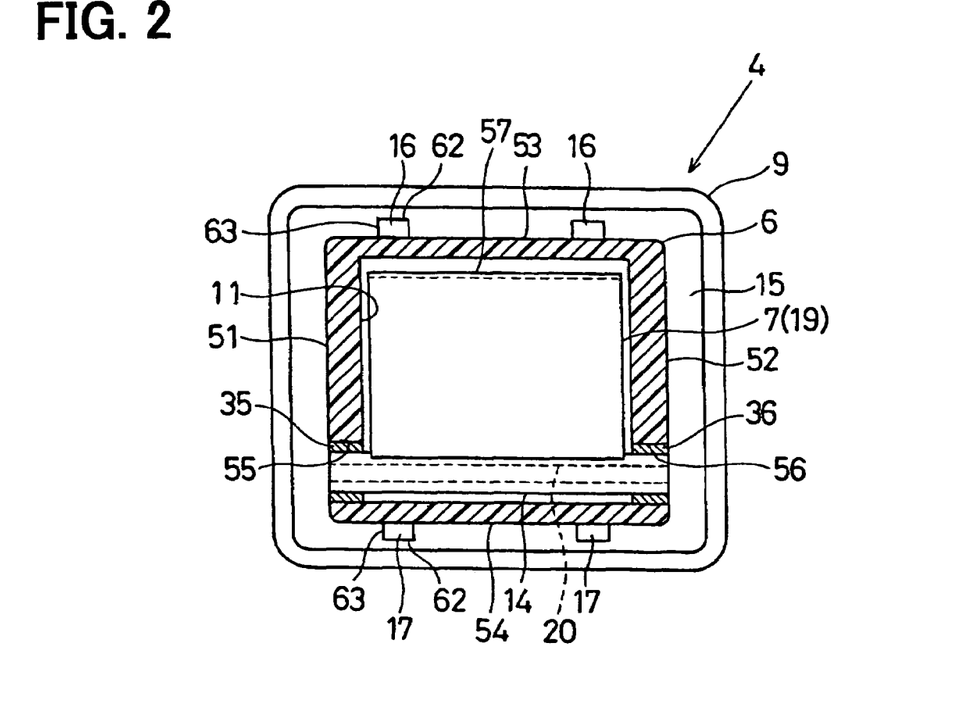
FIG. 2 is a cross sectional view of the valve assembly of FIG. 1, taken along the line II-II.

Here, the intake flow generating device of the first embodiment, as shown in FIGS. 1 and 2, is arranged integrally with the hexahedron-shaped intake manifold 1 disposed upstream of the first and second engine parts. This intake flow generating device, as shown in FIG. 1 to FIG. 5, constitutes an intake flow control valve module (one-piece multiple valve opening and closing device) in which a plurality of valve units 4 is assembled in a corresponding housing 6 so as to open/close a flow path 11 therein.

Furthermore, a valve shaft 5 is included. The valve shaft 5 is a shaft of a polygonal axial cross section formed of a ferrous metallic material in a polygonal shape (e.g., a rectangular shape). The valve shaft 5 extends transversely (e.g., perpendicularly) relative to the axis of the flow path 11.

Figure 5:
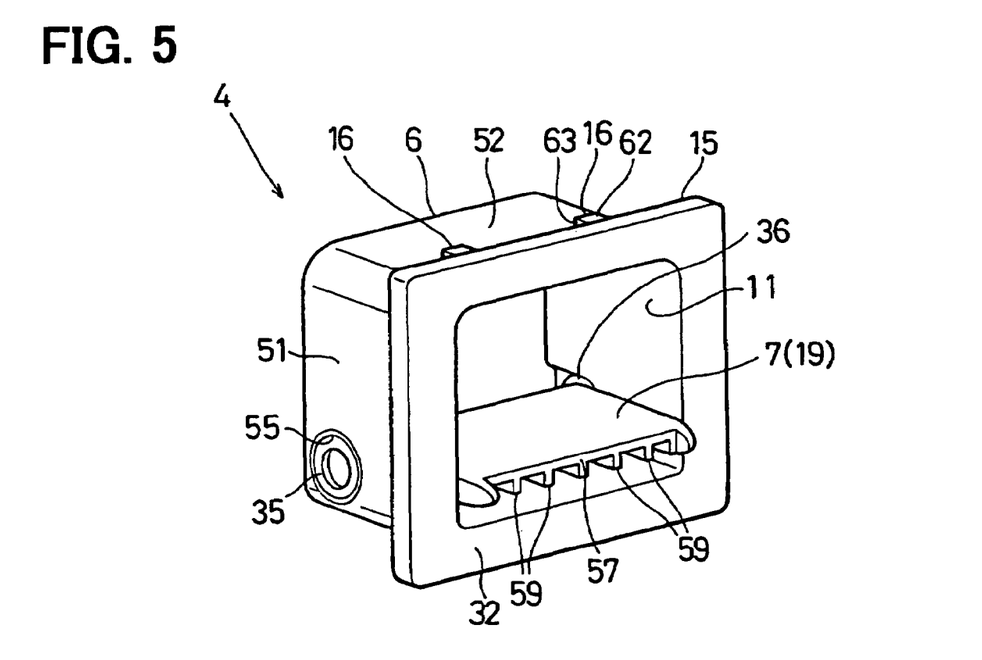
FIG. 5 is a perspective view of a valve unit of the valve assembly of FIG. 1.

The plurality of the valve units 4 comprise, as shown in FIGS. 3 to 5, the plurality of the resin housings 6 (i.e., first to fourth resin housings). The housings 6 are each fixedly supported in a respective fitting hole 21 of the intake manifold 1. The plurality of the resin valves 7 (i.e., one-piece multiple intake flow control valves, first to fourth resin valves, tumble flow control valve (TCV)) are moveably coupled to the housing 6. The valves 7 can move (e.g., rotate) to thereby change flow in the respective flowpath 11 of the respective housing 6. In other words, the valve 7 can moveably rotate between an open position, in which flow through the flowpath 11 is substantially increased, and a closed position, in which flow through the flowpath 11 is substantially decreased.

Here, the valve drive mechanism that performs valve opening and valve closing of the plurality of the intake flow control valves 7 is constructed of a power unit such as an electrical actuator with an electric motor that receives a supply of electricity and generates a drive force (motor output shaft torque) and a power transmission mechanism (in the first embodiment, a gear reduction mechanism) to transmit to the valve shaft 5 a rotational motion of the motor shaft (output shaft) of the electric motor. A brushless DC motor or a brush DC motor, or the like, is employed as the electric motor. Furthermore, it is also acceptable to use an alternating current (AC) motor such as a three-phase induction motor, or the like. Also, the gear reduction mechanism reduces the rotational speed of the motor shaft of the electric motor at a prescribed reduction ratio, and constitutes a power transmission mechanism that transmits the motor output shaft torque of the electric motor to the valve shaft 5. Here, the valve drive device, in particular the electric motor, is constructed to be energized and controlled by an engine control unit (hereinafter "ECU").

Here, the plurality of valve units 4 are provided in number corresponding to the number of cylinders of the engine. These valve units each include a fluid flow path 11 inside the respective housing 6. In the embodiment shown, the fluid flow path 11 has a rectangular axial cross section in which the inducted air flows.

Also, the valves 7 each include a shaft through hole 20, which extends straight along a direction transverse (e.g., perpendicular) to the axis of the flow path 11. The through hole 20 has a polygonal shape. The shaft 5 extends through the shaft through holes 20 of each valve 7. As such, valve drive mechanism rotates the shaft 5 about its axis to thereby rotate the valves 7 in unison.

Here, the plurality of housings 6 are constructed of first and second side wall parts 51, 52 arranged on opposite sides of the flow path 11. The housings 6 also include an upper and lower wall part (the upper wall part referred to below as top wall part 53, the lower wall part referred to below as bottom wall part 54) arranged on opposite sides of the air flow path 11. The top wall part 53 and the bottom wall part 54 have a different length (i.e., longer or shorter) than the first and second side wall parts 51, 52. Furthermore, the four corners (areas where the wall parts 51, 52, 53, 54 meet) are rounded; however, it will be appreciated that the four corners could be angular.

The housings 6 are each molded as a single body in a predetermined shape (single body resin molding) from a polymeric, resin material (e.g., glass fiber reinforced thermoplastic resin). In the housing 6, there is formed a substantially rectangular airflow path 11 defined by the wall parts 51, 52, 53, 54. The airflow path 11 is downstream of the first intake passage 10 of the intake manifold 1 to communicate with the combustion chamber of the respective cylinder via the respective plurality of the intake ports 13.

First and second bearings 35, 36 are included in each of the first and second side wall parts 51, 52, as shown in FIG. 2. More specifically, first and second bearing holes 55, 56 are included that rotatably receive a valve shaft 14 of the respective intake flow control valves 7. The first and second bearings 35 and 36 are coupled (e.g., press-fit) in the first and second bearing holes 55, 56, respectively. The first and second bearings 35, 36 are resinified and integrally molded into a cylindrical shape by resin material (for example, thermoplastic resin). First and second sliding bores of a circular cross section are formed in these first and second bearings 35 and 36 for the purpose of slidably supporting the valve shaft 14 in the rotational direction.

In the embodiment shown, the first and second valve bearing holes 55, 56 are offset in the housing 6. In the embodiment shown, for instance, the bearing holes 55, 56 are offset to be closer to the lower side bottom wall 54 as compared to the top side wall 53. Also, the bearing holes 55, 56 are offset to be upstream side of the housing 6 as compared to the downstream side.

Each of the plurality of intake flow control valves 7 includes the valve shaft 14 which is the center of rotation thereof. The valve shaft 14 is provided on one end of the valve 7, and the opposite end is the free end. In the embodiment shown, there are ribs included on the free end of the valve 7 (see FIGS. 3-5).

The valve 7 has a valve body 19 that is generally flat and rectangular (e.g., square). The valve body 19 rotates relative to the housing 6 around the axis of the valve shaft 14 to change the open area of the airflow path 11 to thereby control flow through the airflow path 11. Here, the valve shaft 14 is integrally molded (integral resin molding) near the rotational center of axis of the intake flow control valve 7.

As shown in FIG. 4 and FIG. 5, when the plurality of the intake control valves 7 are set at a fully open position, an end surface of the back end surface (i.e., the side on which the ribs are formed) of the valve body 19 is positioned adjacent the bottom wall part 54 of the housing 6 with a predetermined gap therebetween. When the plurality of the intake flow control valves 7 are set at a fully closed position, the free end of the valve body 19 is adjacent the top wall part 53 of the housing 6. Thus, the plurality of the intake flow control valves 7 are constructed as cantilever type valves each having a free end at the opposite end of the valve shaft 14.

The plurality of the intake flow control valves 7 are all resinified and integrally formed in a predetermined shape with a resin material (e.g., glass fiber reinforced thermoplastic resin) (one-piece resin molding). A rotational angle (valve angle) of the intake flow control valve 7 is changed within a rotational operating range from a fully open position where a flow quantity through the flow path 11 is increased (e.g., maximized) to a fully closed position where a flow quantity is decreased (e.g., minimized). Thus the intake flow control valve 7 opens/closes each air flow path 11 of the housing 6. In one embodiment, the valve assembly includes a biasing member (not shown) that biases the valves 7 toward the fully open position. In one embodiment, the biasing member is a coiled spring or the like.

The intake flow control valve 7 is rotatably received inside the flow path 11 of the housing 6 so as to open/close the flow path 11. Furthermore, the four corners (corner parts) of each valve body 19 of the plurality of the intake flow control valves 7 are formed with rectangular corners, but the corners in an arc shape or rounded. Also, the free end of the intake flow control valve 7 may be notched to form the open part 57 (see FIG. 5) for forming a desired intake flow path in the space between the housing 6 and the intake flow control valve 7. The open part 57 is optional. Also, a part of the lower end surface or left and right end surfaces of intake flow control valve 7 may be notched to form an opening (i.e., slits) to form the desired intake flow in the space between the housing 6 and the intake flow control valve 7.

On the end surface of the back surface side of the front and back surfaces of the valve body 19, a plurality of ribs 59 are formed such that their height gradually decreases from the valve shaft 14 toward the tip side of the valve body 19. In the vicinity of the axis center of rotation that is the center of rotation of the valve body 19 of the intake flow control valve 7, and the cylindrical valve shaft 14 extending in the axial direction is integrally formed. Inside the valve shaft 14 is formed the shaft through hole 20 through which the valve shaft 14 extends in the axial direction. Also, the shaft through hole 20 is formed in a bore-shape substantially the same as the cross sectional shape of the valve shaft 5 to restrict the relative rotation between the intake flow control valve 7 and the valve shaft 5. Moreover, the valve shaft 14 protrudes from both side surfaces of the valve body 19, and is rotatably received inside the first and second bearing holes 55, 56.

Both ends of valve shaft 14 function, via the first and second bearings 35, 36 as first and second sliding parts pivotally supported in the inside periphery of the first and second bearing holes 55, 56 of the housing 6. A thermoplastic resin for use in the first and second bearings 35, 36, a resin material with excellent sliding characteristics and frictional resistance (such as a thermoplastic resin of polyamide resin (PA) or the like) is used in one embodiment. The first and second bearings 35, 36 may be integrally molded by the resin compound material formed by mixing with or adding to a resin material, a low sliding resistance material (for example, fluorinated resin powder such as terafluorinated ethylene resin (PTFE)) for lowering a sliding resistance in relative movement between the valve shaft 14 of the intake flow control valve 7 and the first and second bearings 35, 36.

The valve shaft 5 is encased in the valve shaft 14 of the intake flow control valve 7, and the outside peripheral side of the valve shaft 5 is rotatably supported by the first and second bearings 35, 36. The plurality of the intake flow control valves 7 are each fixedly held by the single valve shaft 5. Also, in one embodiment, the thermoplastic resin used for the intake manifold 1, housing 6 and intake flow control valve 7 is polyamide resin (PA), unsaturated polyester resin (UP), poly (p-phenylene sulfide) (PPS), polybutylene terephthalate (PBT), or the like. As such, heat resistance and strength of those parts are sufficient.

The plurality of the valve units 14 of the first embodiment have a flange 15 at the outside periphery part of each housing 6. This flange 15 is integrally formed (integral resin molding) at the outside periphery part of the downstream end part of the housing 6. Thus, the flange 15 is a substantially flat and rectangular and extends away perpendicularly from the housing 6. The four corners of the flange 15 are chamfered in the embodiment shown; however, it will be appreciated that the corners 15 can be angular. The outside periphery surface of the flange 15 functions as the second seal surface to which the second seal part of gasket 9 seats tightly as shown in FIG. 1.

At the upstream side end surface of the flange 15 (i.e., the surface that faces upstream in relation to the direction of fluid flowing in the fluid flow path 11) is arranged a first contact surface 61. As stated above, the intake manifold 1 includes a first control surface 41 that faces downstream in relation to the direction of fluid flowing in the fluid flow path 11. The first contact surface 61 abuts against and is engaged by the first control surface 41 as shown in FIG. 1.

Also, at the open end surface of the downstream side end surface of the flange 15 and the downstream end part (open periphery part of the air flow path 11) of the housing 6 is arranged a second coupling end surface 32 arranged as opposed to an upstream side end surface 29 of the head cover 2. In the embodiment shown in FIG. 1, there is a predetermined space between the flange 15 and the upstream side end surface 29 of the head cover 2.

The plurality of the valve units 4 of the first embodiment have a plurality of male fitting parts (second fitting parts) 16, 17 that extend upstream from the flange 15. The male fitting part 16 is integrally molded (integral resin molding) to the housing 6 in one embodiment. The intake manifold 1 includes corresponding ones of the female fitting parts 33, 34, which are grooves that extend upstream from the first control surface 41. The male fitting parts 16, 17 are received in corresponding ones of the female fitting parts 33, 34.

The outermost surface of the male fitting parts 16, 17 (i.e., the surface furthest away in a transverse direction away from the axis of the flow path 11) is slightly closer to the axis of the flow path 11 as compared to the outside periphery surface of the flange 15 (in the Y-direction). In this way, even in the vicinity of the two male fitting parts 16, 17, a necessary surface area is ensured for the first contact surface 61 and the first control surface 41. Moreover, the two male fitting parts 16, 17 have a second contact surface 62 (i.e., Y-direction contact surface, fitting surface) which is engaged to the second control surface 42 of the two female fitting parts 33, 34 of the intake manifold 1. The male fitting parts 16, 17 also have a third contact surface (i.e., Z-direction contact surface, fitting surface) which is engaged to a third control surface 43 of the two female fitting parts 33, 34 of the intake manifold 1.

The plurality of the gaskets 9 are arranged to encompass the periphery of flange 15 of each housing 6 of each of the plurality of the valve units 4. In one embodiment, the corners of the ring shape of the gasket 9 are rounded; however, these corners could be angular in another embodiment. Also, in one embodiment, the axial cross section of the gaskets 9 is rectangular. The gaskets 9 are made out of an elastic polymer (e.g., elastic rubber, oil-resistant rubber, chloroprene rubber, CR, nitrile rubber, NBR) and are integrally formed in a molding process. Thus, each of the plurality of the gaskets 9 is composed of an integrally molded and single polymeric (e.g., rubber) article.

The cross section of the gasket 9 is such that first dimension measured perpendicular to the axis of the gasket 9 is less than a second dimension measured perpendicular to both the axis of the gasket 9 and the first dimension. For instance, as shown in FIG. 1, the height of the cross section of the gasket 9 (measured in the Y-direction) is less than the width of the cross section of the gasket 9 (measured in the X-direction).

The gasket 9 seals the space between the first control surface 41 of the intake manifold 1 and the upstream end surface 29 of the head cover 2. The gasket 9 also seals the annular gap between the inside periphery surface of the gasket receiving aperture 22 of the intake manifold 1 and the outside periphery surface of the flange 15 of the housing 6. Furthermore, the gasket 9 dampens vibration transmitted to the respective valve unit 4. More specifically, the gasket 9 absorbs vibration transmitted from the engine body (e.g., the cylinder head 3) through the head cover 2 and the intake manifold 1 to each housing 6 of each of the plurality of valve units 4.

Figure 6A:
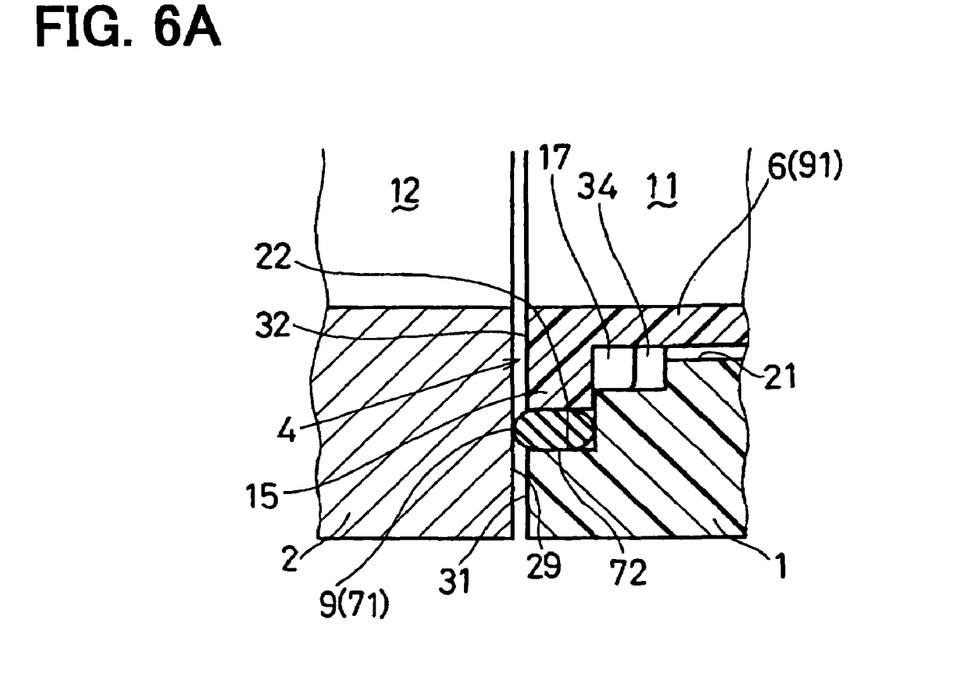
FIG. 6A is an enlarged sectional view of one embodiment of a seal of the valve assembly of FIG. 1.

As shown in FIG. 1, FIG. 2 and FIG. 6A, the gasket 9 includes two first seal parts 71 that seal the space between the first control surface 41 of the intake manifold 1 and the upstream end surface 29 of the head cover 2. The gasket 9 also includes two second seal parts 72 that seal the annular gap between the inside periphery surface of the gasket receiving aperture 22 of the intake manifold 1 and the outside periphery surface of the flange 15 of the housing 6.

The two first seal parts 71, as shown in FIG. 6A, are the first elastic deforming part that elastically deforming in substantially the same direction (X-direction) as the axis of the flow path 11. The first seal parts 71 seat and air-tightly seal against both the first control surface 41 of the intake manifold 1 and the upstream side end surface 29 of the head cover 2.

The two second seal parts 72, as shown in FIG. 1, FIG. 2 and FIG. 6A, are second elastic deforming parts that elastically deform in a perpendicular direction (i.e., the Y-direction, Z-direction) relative to the axis of the flow path 11. The second seal parts 72 seat and air-tightly seal against both the surface of the gasket receiving aperture 22 of the intake manifold 1 and the outside periphery surface of the flange 15 of the respective housing 6.

Also, in one embodiment, the gasket 9 is constructed such that a compression ratio of the second seal part 72 is less than a compression ratio of the first seal part 71. Accordingly the first seal part 71 can supply a high seal characteristic, and the second seal part 72 can supply a sufficient sealing characteristic, but lower sealing characteristic than the first seal part 71. In the embodiment of FIG. 1, for instance, the gasket 9 has an elliptical cross section. To achieve the proper compression ratio, the wider section of the elliptical gasket 9 is used as the first seal part 71, and the thinner section of the elliptical gasket 9 is used as the second seal part 72.

Next, one embodiment of the assembly method of the intake flow control device of the internal combustion engine in the first embodiment will be explained simply with reference to FIG. 1 to FIG. 6A. First, the engine body (head cover 2 and cylinder head 3, or the like) is manufactured as an aluminum composite mold (aluminum die-cast molding). Also, the valve shaft 5 is integrally formed of a metallic material. Also, the plurality of the gaskets 9 are integrally formed of an elastic rubber body.

The intake manifold 1, the housings 6 of the plurality of the valve units 4, and the intake flow control valve 7 (i.e., the valve shaft 14 and the valve body 19) are each manufactured by an injection molding method (injection molding process). This injection molding method is a method of molding wherein resin material in pellet form is melted and injected under pressure into a die for injection molding (molding die). The cooled and solidified parts are taken out from the die to produce a thermoplastic resin article (molded resin part, molded resin body). Furthermore, the housing 6 and the intake flow control valve 7 may be molded integrally in one die for injection molding at the same time (integral resin molding).

Next, the plurality of the valve units 4 are assembled inside the interior of the plurality of the fitting holes 21 of the intake manifold 1. Specifically, the valve units 4 are inserted from the downstream side toward the upstream side along the axial direction of the plurality of the fitting holes 21 of the intake manifold 1. The plurality of the valve units 4 are assembled into the interior of the plurality of the fitting holes 21 until the first contact surface 61 of the flange 15 abuts the first control surface 41 (first assembly step).

When the plurality of valve units 4 are assembled into the interior of the plurality of the fitting holes 21, the two male fitting parts 16 are received into the two female fitting parts 33, and the two male fitting parts 17 are received into the two female fitting parts 34.

In this way, as shown in FIG. 1 and FIG. 2, the assembly position (X-direction assembling position) of the plurality of the valve units 4, in substantially the same direction as the direction of intake air in relation to the intake manifold 1, is set (positioned) at the position where the first contact surface 61 of each flange 15 of each housing 6 contacts the first control surface (X-direction alignment surface) of the intake manifold 1. Also, the assembly position (Y-direction assembly position, Z-direction assembly position) of the plurality of the valve units 4 in a position perpendicular to the axis of the flow path 11 is set (positioned) at the position where the two male fitting parts 16, 17 of each housing 6 of each of the plurality of valve units 4 are received in the two female fitting parts 33, 34 of the intake manifold 1. In other words, interaction between the surfaces of the male fitting parts 16, 17 and the corresponding surfaces of the female fitting parts 33, 34 defines an assembly position of the valve unit 4 in a direction substantially perpendicular to the axis of the fluid flow path 11 (i.e., limits movement of the housing 6 in the Y- and Z-directions relative to the intake manifold 1).

That is, for the plurality of the valve units 4, the assembly position (Y-direction assembly position) in relation to the intake manifold 1 in the direction perpendicular to the axis of the flow path 11 is determined (positioned) at the position where the second contact surface 62 of the two male fitting parts 16 and 17 of each of the housings 6 contacts the second control surface (Y-direction alignment surface) 42 of the female fitting parts 33 and 34 of the intake manifold 1. Also, for the plurality of the valve units 4, the assembly position (Z-direction assembly position) in relation to the intake manifold 1 in the direction perpendicular to the axis of the flow path 11 is determined (positioned) at the position where the third contact surface 63 of the two male fitting parts 16, 17 of each of the housings 6 contacts the third control surface (Z-direction alignment surface) 43 of the two female fitting parts 33, 34 of the intake manifold 1.

Accordingly, a plurality of the valve units 4 are arranged inside the common intake manifold 1 and are aligned and spaced at regular intervals in the axial direction of the valve shaft 5. The hole dimensions of the gasket receiving aperture 22 and the width dimensions of each flange 15 of each housing 6 may be predetermined such that the first coupling end surface 31 of the intake manifold 1 and the second coupling and surface 32 of each housing 6 of each of the plurality of the valve units 4 are arranged at substantially the same plane.

Next, after the plurality of the valve units 4 have been assembled into the inside of the plurality of the fitting holes 21 of the intake manifold 1, the tip side (contacted part) of each valve body 19 of the plurality of the intake flow control valves 7 is made to abut (directly linear contact) (second assembly step) a valve engaging part provided on the top wall surface 53 (corresponding to the fully closed position) of the plurality of the housings 6. At this time, the plurality of the intake flow control valves 7 are arranged to be inclined slightly at a prescribed rotation angle (fully closed angle: θ) in the valve opening direction in the perpendicular direction orthogonal to the axis line direction of the air flow path 11. That is, the valve opening of each of the plurality of the intake flow control valves 7 is set at the valve opening corresponding to the fully closed position. All of the shaft through holes 20 arranged along the valve shafts 14 of all of intake flow control valves 7 are arranged along the same center of axis as all of the shaft through bores 26 of intake manifold 1.

Next, as shown in FIG. 3. and FIG. 4, the valve shaft 5 is aligned from the shaft through bore 26 of the left side wall part 24 of intake manifold 1 through the shaft through holes 20 of all of the intake flow control valves 7 and through the shaft through bores 26 of all of the wall partitions 23 of intake manifold 1, and is inserted (e.g., pressure inserted) into the shaft through bore 26 of the right side wall part 25 of the intake manifold 1. In this way, all of the intake flow control valves 7 are integrally connected to the outside periphery of the valve shaft 5 (third assembly step) such that it is possible to simultaneously change the angle of all openings with the single valve shaft 5.

Next, each of the plurality of the gaskets 9 is assembled (fourth assembly step) into the substantially rectangular annular space (square annulus) between the interior circumference surface of the gasket receiving aperture 22 and the first control surface 41 of the intake manifold 1 and the outside periphery surface of the flange 15 of each housing 6. Each second seal part 72 of the plurality of gaskets 9 is inserted between the inside periphery surface of the gasket receiving aperture 22 and the outside periphery surface of the flange 15, such that the second seal part 72 is compressed and elastically deformed in a direction perpendicular to the direction of fluid flow in the flow path 11 (i.e., the Y- and Z-directions, the compression diameter direction).

Since both the second seal surfaces of the second seal part 72 are attached tightly to the inside periphery surface of the gasket receiving aperture 22 and the outside periphery surface of the flange 15, the annular gap formed in the space between the intake manifold 1 and the plurality of the valve units 4 is sealed. Accordingly, leakage of inducted air is unlikely to the outside of the intake duct that has flowed into the tubular gap between the inside periphery part of the fitting holes 21 and the outside periphery part of housing 6 from the first intake passage 10 inside the intake manifold 1 and from the annular gap between the upstream side end surface of each housing 6 of each of the plurality of the valve units 4 and the downstream side end surface of each of the blocks 27, 28 in the intake manifold 1.

Next, the first coupling end surface 31 of the intake manifold 1 is coupled by a fastener (e.g., clip, latch, screw, locking screws etc.) (not shown) to the upstream side end surface 29 of the head cover 2 which is attached to the upper portion of the engine body (cylinder head 3). More specifically, the first coupling end surface 31 of the intake manifold 1 and the upstream side end surface 29 of the head cover 2 are brought to a state wherein they face each other and are pressed together and fastened together (fifth assembly step). Since each of the first seal parts 71 of the plurality of the gaskets 9 is inserted between the first control surface 41 of intake manifold 1 and the upstream side end surface 29 of the head cover 2, the first seal part 71 is compressed in substantially the same direction as the axial direction of the flow path 11 (i.e., the X-direction) and is elastically deformed.

In this way, since both first seal surfaces of the first seal part 71 are attached tightly to the first control surface 41 of the intake manifold 1 and the upstream side end surface 29 of the head cover 2, the annular gap formed between the intake manifold 1 and the head cover 2 is sealed. Thus, leakage is unlikely out of the intake duct of inducted air flowing into the annular periphery gap between the upstream side end surface 29 of the head cover 2 and the second coupling end surface 32 of the housing 6 from the air flow path 11.

Using the above assembly operation, the intake flow generation device can be assembled inside the intake duct, and the first coupling end surface 31 of the intake manifold 1 and the second coupling end surface 32 of each housing 6 of each of the plurality of the valve units 4 can be air-tightly coupled to the upstream side end surface 29 of the head cover 2.

Next, the operation of the intake flow control device for the internal combustion engine of the first embodiment will be explained briefly with reference to FIG. 1 to FIG. 6A.

The ECU, when the engine is at a prescribed operating state (for example, during engine starting or idling operation), sends current to an electric motor such that each of the intake flow control valves 7 of the plurality of the valve units 4 is in a fully closed state. When the electric motor receives electric current, rotational power (motor power output shaft torque) of the electric motor is transmitted to the single valve shaft 5 through the gear reduction mechanism. In this way, the valve opening angle (valve position) of all of the intake flow control valves 7 can be changed simultaneously by the single valve shaft 5. That is, all of the intake flow control valves 7 rotate around the axis of the valve shaft 14, against the urging force of the biasing member (e.g., coil spring), and each valve opening angle (valve position) of the intake flow control valves 7 changes from the fully open position (refer to FIG. 3 to FIG. 5) to the fully closed position (refer to FIG. 1 and FIG. 2).

Accordingly, intake air that has been filtered by the air cleaner flows into the interior of the air flow path 11 of each of the housings 6 of the plurality of the valve units 4 via the intake path of the intake duct (throttle body or surge tank) and the plurality of the first intake passages 10 of the intake manifold 1. Since each valve opening angle (valve position) of all of the intake flow control valves 7 is set at the fully closed position, a deflection air path state is formed only at one side (upper layer side) of the open part 57 formed at each tip end (shown as the upper end side) of all of the intake flow control valves 7. The inducted air passing through the plurality of the open parts 57 and deflected to the one side (upper layer side) is supplied to the interior of the plurality of the intake ports 13 of the cylinder head 3 via the second intake passages 12 of the plurality of the head cover 2 and, further, passing around the circumference of the intake valve, is introduced into the interior of the combustion chamber of each cylinder of the engine body. At this time, almost all of the intake air introduced into the combustion chamber passes through each open part 57 of the plurality of the intake flow control valves 7, such that the intake flow introduced into the combustion chamber is a vertical intake air swirl (tumble flow).

That is, when all of the intake flow control valves 7 of the plurality of the valve units 4 are fully closed, the air-fuel mixture can be delivered to the combustion chamber of each cylinder of the engine body via the upper parts of the plurality of the air flow paths 11, the plurality of the second intake flow paths 12 and the plurality of the intake ports 13. Therefore, an intake air swirl flow (tumble flow) in the vertical direction in the combustion chamber of each cylinder of the engine body can be easily generated. Accordingly, the tumble flow which promotes the combustion of the air-fuel mixture in the combustion chamber of each cylinder of the engine body can be positively generated, such that combustion can occur at an air-fuel ratio that is usually difficult to combust (lean combustion), and fuel efficiency can be improved without deteriorating an engine performance. Also, since the vertical intake air swirl flow (tumble flow) can be easily generated, the velocity of combustion in the combustion chamber can be promoted and the combustion efficiency can be improved. As a result, fuel consumption and exhaust emissions can be improved when the engine is at a prescribed operation condition (for example, during idling).

In the first embodiment, when the engine is at a prescribed operating condition, the electric motor is electrically controlled and each opening angle (valve position) of all of the intake flow control valves 7 is set at a fully closed state (fully closed position). That is, the normally open-type intake flow control valve 7 is driven to close by a valve drive device. Oppositely, it is acceptable that when the engine is at a prescribed operating condition, the electrical current to the electric motor is stopped, and through the force of a coil spring each valve opening angle (valve position) of all of the intake flow control valves 7 is at the fully closed state (fully closed position). In this case, the device is a normally closed-type intake flow control valve.

As described above, in the intake flow control device (intake flow generating device) for the internal combustion engine in the first embodiment, the gasket 9 is installed between the first control surface 41 of the intake manifold 1 and the upstream side end surface 29 of the head cover 2, and is installed between the inside periphery surface of the gasket receiving aperture 22 of the intake manifold 1 and the outside periphery surface of the flange 15 of each housing 6 of each of the plurality of the valve units 4. In this way, the first seal part 71 of the gasket 9 reduces (e.g., prevents) leakage of inducted air (intake air) to the outside of the intake manifold 1 from between the first coupling end surface 31 of the intake manifold 1 and the upstream side end surface 29 of the head cover 2.

The second seal part 72 of the gasket 9 reduces (e.g., prevents) the leakage of inducted air (intake air) to the outside of the intake duct from the space between the interior peripheral surface of the gasket receiving aperture 22 and the outer peripheral surface of each housing 6 of the plurality of the valve units 4. Furthermore, the vibration transmitted from the engine body (cylinder head 3) via the head cover 2 and intake manifold 1 to each housing 6 of each of the plurality of the valve units 4 can be damped (absorbed). Thus, a common gasket 9 is used for each of these functions. As compared to the previous art and comparative example 1, the number of parts and assembly time can be reduced, and therefore, a reduction in total product cost of the intake flow control device for the engine (intake flow generating device) is possible.

Also, the compression ratio is set at a low compression ratio for the second seal part 72 at which a lower compression ratio is acceptable than that for the first seal part 71. The compression ratio is higher for the first seal part 71, at which a high seal characteristic is needed. In this way, the first seal part 71 of the gasket 9 is maintained constantly at a more flexible state than that of the second seal part 72 of the gasket 9, and the second seal part 72 of the gasket 9 is maintained constantly at a more rigid state than that of the first seal part 71 of the gasket 9. Accordingly, the first seal part 71 of the gasket 9, when it is squeezed between the first control surface 41 of the intake manifold 1 and the upstream side end surface 29 of the head cover 2, achieves an excellent seal characteristic as it seats tightly to both end surfaces (first control surface 41, upstream side end surface 29). This reduces (e.g., prevents) a leakage of inducted air (intake air) from the space requiring a high seal characteristic between the first coupling end surface 31 of the intake manifold 1 and the upstream side end surface 29 of the head cover 2 to the outside of the intake duct.

Here, the intake flow control device (intake flow generating device) for an internal combustion engine of the first embodiment is provided with an alignment configuration for the intake manifold 1 and the plurality of valve units 4 that will be described in greater detail. The alignment configuration improves the gasket seal characteristic between the intake manifold 1 and each housing 6 of the plurality of valve units 4 and improves the positioning precision between the intake manifold 1 and the plurality of valve units 4.

First, the alignment, in relation to intake manifold 1, of the plurality of valve units 4 in substantially axial direction of the flow path 11 (left and right direction as shown in FIG. 1, X-direction) will be briefly explained with reference to FIG. 1 and FIG. 2.

In the first embodiment, the X-direction alignment surface which controls the assembly alignment in relation to the intake manifold 1 is the first control surface 41 (X-direction alignment surface). The reason for this is that the engine body head cover 2 is a cast metal article such as aluminum die-cast or the like, and has an attachment surface (the upstream side end surface 29 of the head cover 2), which has been uniformly machine cut, for attaching to the intake manifold 1 requiring planar precision. The intake manifold 1 is a thermoplastic resin molded article, but when this intake manifold 1 is attached to the upstream end surface 29 of the head cover 2, the intake manifold 1 can appropriately be attached to the upstream side end surface 29 of the head cover 2 of cast metal with high rigidity and good planar precision. Thus, the planar precision of the first coupling end surface 31 of the intake manifold 1 is improved.

Accordingly, in the first embodiment, the X-direction assembly position of the plurality of the valve units 4 in relation to the intake manifold is set at the position where the first contact surface 61 of the flange 15 of each housing 6 of the plurality of the valve units 4 contacts the first control surface (X-direction alignment surface) 41 of the intake manifold 1. That is, the X-direction assembly positioning of the plurality of the valve units 4 in relation to the intake manifold 1 is established at the first control surface 41 (X-direction alignment surface). This improves the positioning accuracy in the X-direction of the plurality of the valve units in relation to the intake manifold 1.

Next, the alignment, in relation to the intake manifold 1, of the plurality of the valve units 4 in a direction perpendicular to the axis of the flow path 11 (Y- and Z-directions) will be briefly explained with reference to FIG. 1 and FIG. 2.

In the first embodiment, the Y-direction and Z-direction alignment that determines the assembly position of the plurality of the valve units 4 is set by the two female fitting parts 33, 34. Also, the plurality of valve units 4 are provided with the two male fitting parts 16 and 17 at the outside periphery of each housing 6 to fit respectively into the two female fitting parts 33 and 34 of the intake manifold 1.

More specifically, in the first embodiment, the assembly position in the Y-direction of the plurality of the valve units 4 in relation to the intake manifold 1 is set at the contact position where the second contact surface 62 of the two male fitting parts 16, 17 of each housing 6 of the plurality of the valve units 4 contacts the second control surface (Y-direction alignment surface) 42 of the two female fitting parts 33, 34 of the intake manifold 1. That is, the alignment in the Y-direction of the plurality of the valve units 4 in relation to the intake manifold 1 is determined at the second control surface 42 (Y-direction alignment surface) of the two female fitting parts 33, 34 lowered by one step from the first control surface 41 near the very precise first coupling end surface 31 of the intake manifold 1. Therefore, it is possible for the Y-direction alignment precision of the plurality of valve units 4 in relation to the intake manifold 1 to be improved.

Also, in the first embodiment, the assembly position in the Z-direction of the plurality of the valve units 4 in relation to the intake manifold 1 is determined at the position where the third contact surface 63 of the two male fitting parts 16, 17 of each housing 6 contacts the second control surface 42 (Z-direction alignment surface) of the two female fitting parts 33, 34 of the intake manifold 1. That is, the alignment of the plurality of the valve units 4 in relation to the manifold 1 in the Z-direction is determined at the third control surface 43 (Z-direction alignment surface) of the two female fitting parts 33, 34 that are lowered by one step from the first control surface 41, close to the very precise first coupling end surface 31 of the intake manifold 1. Therefore, it is possible for the Z-direction alignment of the plurality of the valve units 4 in relation to the intake manifold 1 to be improved.

Accordingly, it is possible to further improve the alignment accuracy of the intake manifold 1 with the plurality of the valve units 4 in the intake flow control device (intake flow generating device) for an internal combustion invention of the first embodiment. Therefore, misalignment of the position of the shaft portion (the position of the valve shaft 14) with the engine body side communicating path (the second intake passage 12 of the head cover 2 and the intake port 13 of the cylinder head 3) is eliminated, and the generation of the most appropriate intake air swirl (tumble flow) is possible. Therefore, an improvement in engine performance and an improvement in fuel consumption can be achieved. Also, since the alignment accuracy of the intake manifold 1 with the plurality of the valve units 4 can be further improved, the gasket seal characteristic of the intake manifold 1 and each of the housings 6 can also be further improved.

Also, in the intake flow control device (intake flow generating device) for an internal combustion engine in the first embodiment, the first and second bearings are respectively arranged in the first and second bearing holes 55, 56. And, the first and second valve bearing holes 55, 56 rotatably receive the valve shafts 14 of the plurality of the intake flow control valves 7. The first and second bearings are arranged offset nearer to an upstream end of the housing 6.

Each housing 6 of the plurality of the valve units 4 has the outer circumference provided with the flange 15 which has the outer circumference surface that opposes the inner circumference surface of the gasket receiving aperture 22 of the intake manifold 1. This flange 15 is arranged offset further to the downstream side of the housing 6, and in particular toward the outer circumference of the open circumference end edge of the air exit side of the air flow path 11. In the first embodiment, the gasket 9 is installed to encompass the surrounding area of the flange 15 of each of the housings 6 of the plurality of valve units 4. Thus, the gasket 9 encompasses the housing 6 at a position spaced away from the center of rotation of the valve 7 along the axis of the flow path 11.

In this way, the installation position of the gasket 9 can be set spaced from each valve shaft 14 of the plurality of the intake flow control valves 7 and from each of the first and second bearings of the plurality of the housings 6, and at the outer circumference of the flange 15 at the head cover side opposite the positions of these valve shafts 14 and the first and second bearings. Therefore, deformation is unlikely in the housing 6 in the vicinity of the valve shaft 14 and the vicinity of the first and second bearings resulting from the reaction force of the second seal part 72 of the gasket 9 when the second seal part 72 of the gasket 9 is squeezed in the space between the inside circumference surface of the gasket receiving aperture 22 of the intake manifold 1 and the outside circumference surface of each of the housings 6 of the plurality of the valve units 4. Accordingly, the necessary appropriate gap (clearance) between the flow path wall surface of the housing 6 (wall surfaces of both sides, top wall surface, bottom wall surface) and the intake flow control valve 7 for the opening and closing operation of the intake flow control valve 7 between the fully open position and the fully closed position becomes more easily secured, such that faulty operation and valve lock of the intake flow control valve 7 can be reduced. In this way, reliability in regards to the intake flow control device (intake flow generating device) for an internal combustion engine can be improved.

Second Embodiment

Figure 6B:
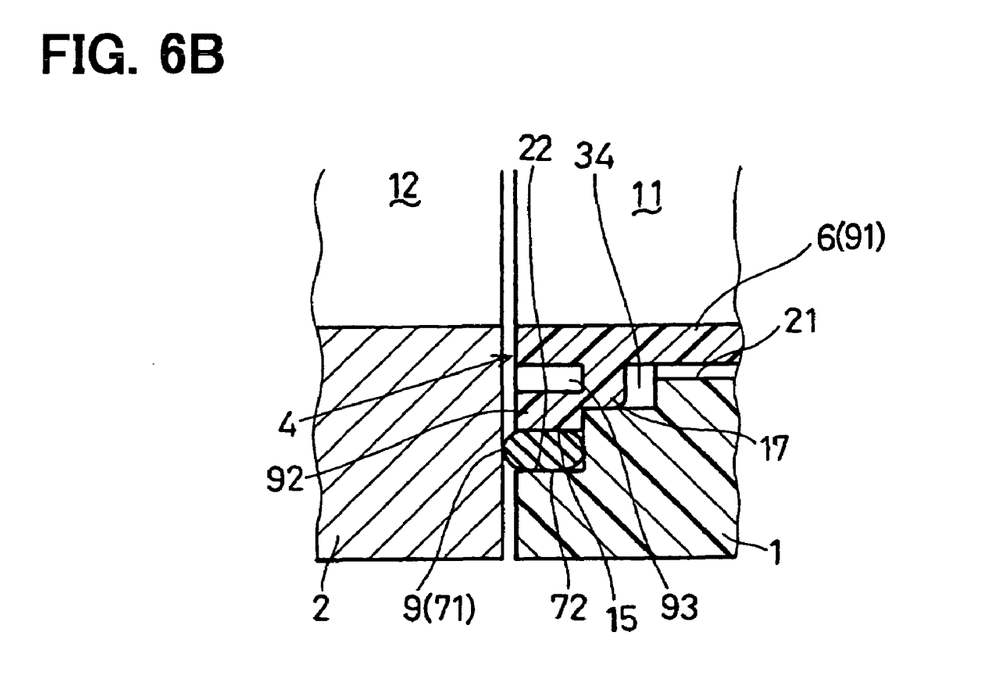
FIG. 6B is an enlarged sectional view of another embodiment of a seal of the valve assembly.

Referring now to FIG. 6B, a second embodiment is shown, where components similar to those of FIGS. 1 through 6A are indicated by similar numerals. The intake flow control device of the first embodiment, as shown in FIG. 6A, comprises a housing 6 for each of the plurality of valve units 4 and also comprises an inner pipe 91 in a rectangular pipe shape (square pipe shape) which forms the air flow path 11 that extends straight in the direction of intake air. At the outside periphery part of the inner pipe 91, the flange 15, having an outside periphery surface that opposes the inside periphery surface of the gasket receiving aperture 22 of the intake manifold 1, is arranged to project to the outside. This flange 15 is provided on the downstream side of the housing 6.

The single component gasket 9 is installed between the first control surface 41 of the intake manifold 1 and the upstream side end surface 29 of the head cover 2, and is installed between the inside periphery surface of the gasket receiving aperture 22 of the intake manifold 1 and the exterior peripheral surface of the flange 15 of the housing 6. The compression ratio is higher for the first seal part 71 as compared to the compression ratio for the second seal part 72.

In contrast, the second embodiment shown in FIG. 6B is configured such that the housing 6 on the head cover side end surface (downstream end surface part) is of a dual-pipe structure. More specifically, the housing 6 of this dual-pipe structure comprises an inner pipe 91 that forms the air flow path 11 therein, and an outer pipe 92 arranged to encompass a surrounding area of this inner pipe 91. The outer pipe 92 is arranged offset to the downstream side of the housing 6. The outer pipe 92 itself is a flange 15 which serves as the installation position for the gasket 9. Also, between the outer wall surface of the inner pipe 91 and the inner wall surface of the outer pipe 92 is formed a prescribed rectangular annular space 93 (or a square-shaped annular space). The inner pipe 91 and the outer pipe 92 are connected by the two male fitting parts 16 and 17 arranged at the top wall part 53 and the bottom wall part 54 of the inner pipe 91.

Thus, the vicinity of the flange 15 of the housing 6, that is, the head cover side end surface (downstream end side surface) of the housing 6, is of a dual-pipe structure. This structure functions such that the deformation of the outer pipe 92 which receives directly the reaction force of the gasket 9 is unlikely to be transmitted to the inner pipe 91. In this way, when the first seal part 72 of the gasket 9 is squeezed into the space between the inside periphery surface of the gasket receiving aperture 22 of the first intake manifold 1 and the outside periphery surface of each housing 6, deformation is unlikely of the inner pipe 91 in the vicinity of the valve shaft 14 and the vicinity of the first and second bearings that accompanies the reaction force of the second seal part 72 of the gasket 9. Accordingly, ensuring the necessary appropriate gap (clearance) between the flow path wall surface (both side wall surfaces, top wall surface, bottom wall surface) of the inner pipe of the housing 6 and the intake flow control valve 7 for the opening and closing operation of the intake flow control valve 7 becomes easier, and faulty operation and valve lock of the intake flow control valve 7 is less likely. In this way, it is possible to improve the reliability in relation to the intake flow control valve device (intake flow generating device) for an internal combustion engine.

Embodiments of the Sealing Member

Referring now to FIGS. 7A-7D, various embodiments of the sealing member (i.e., gasket 9) are shown in axial cross section.

Figure 7A:
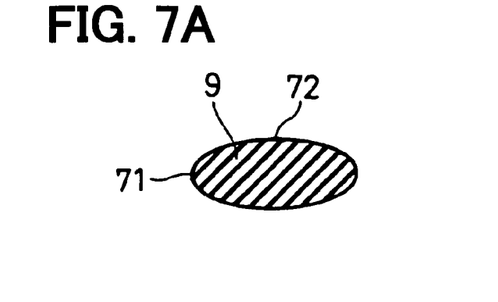
FIGS. 7A to 7D are sectional views of various embodiments of a sealing member of the valve assembly.
Figure 7B:
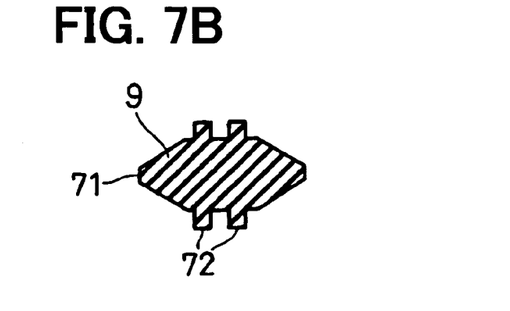
Figure 7C:
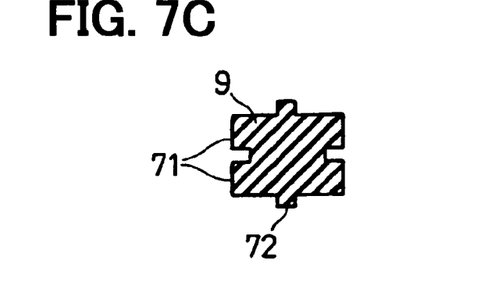
Figure 7D:
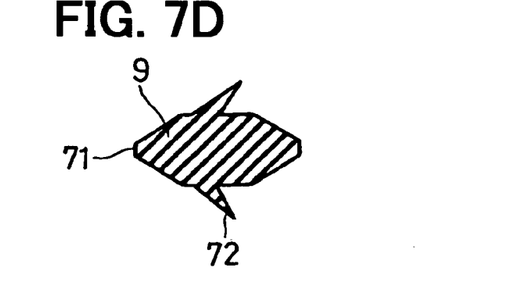

In the first and second embodiments described above, the gasket 9 of FIG. 7A is incorporated. In FIG. 7A, the gasket 9 of an elliptical cross section as a gas seal material is employed. Thereby, the first seal part 71 is set to have a high pressure compression ratio and the second seal part 72 is set to have a lower pressure compression ratio than that of the first seal part 71. Here, any of the shapes shown in FIGS. 7B to 7D may be used as a shape of the gasket 9. Even in these cases, the structure of the gasket 9 can be adapted such that the compression ratio of the second seal part 72 is at a lower compression ratio (high rigidity) than the compression ratio of the first seal part 71. That is, the structure of the gasket 9 can be adapted such that the compression ratio of the first seal part 71 is at a higher compression ratio (more flexible) than the compression ratio of the second seal part 72. In the embodiments of FIGS. 7B, 7C, and 7D, the gasket 9 includes ridges that extend straight away (FIGS. 7B, 7C) or at an angle (FIG. 7D) from the axis of the gasket 9. Also, in the embodiment of FIG. 7B, the gasket is generally tapered at the first seal part 71, and is flat with ridges extending straight away from the second seal part 72. In the embodiment of FIG. 7C, the gasket is generally rectangular with notches in the first seal part 71 and with ridges extending straight away from the second seal part 72. In the embodiment of FIG. 7D, the gasket is generally tapered at the first seat part 71, and is flat with ridges extending at an angle away from the second seal part 72.

Modification

In the embodiments described above, the intake flow control device for the internal combustion engine (intake flow generating device or swirl generating device) is adapted to generate a vertical intake swirl (tumble flow) for promoting combustion of the mixture in the combustion chamber for each cylinder of the engine body. However, the intake flow control device for the internal combustion engine (intake flow generating device or swirl generating device) may be adapted to generate a later intake swirl (swirl flow) for promoting combustion of the mixture in the combustion chamber for each cylinder of the engine body. In addition, the intake flow control device for the internal combustion engine (intake flow generating device or swirl generating device) may be adapted to generate a squish swirl for promoting combustion of the mixture in the combustion chamber for each cylinder of the engine body.

In the embodiment, the intake device for the internal combustion engine is incorporated in the intake flow control device for the internal combustion engine for controlling intake air aspired into the combustion chamber for each cylinder of the engine. However, the valve unit may be incorporated into an intake control device for the engine for controlling an intake air aspired into the combustion chamber for each cylinder of the engine. In this case, an intake flow quantity-controlling valve such as an idle rotational speed-controlling valve and a throttle valve is incorporated into the housing. In addition, the valve unit may be applied to an exhaust gas recirculation device (EGR control valve unit) equipped with a housing having an air flow path communicated with an exhaust gas recirculation path for recirculating a part of an exhaust gas of the engine (EGR gas) from an exhaust system to an intake system and an EGR control valve received in the housing so as to open/close therein for controlling an exhaust gas recirculation quantity. Further, the valve unit may be applied to an exhaust gas control valve unit equipped with a housing having an air flow path communicated with an exhaust passage of the engine and an exhaust control valve received in the housing so as to open/close for controlling an exhaust gas emitted from the cylinders of the engine.

In addition, the intake device for the internal combustion engine may be incorporated into a variable intake device for an internal combustion engine equipped with a variable intake valve. The variable intake valve is an intake control valve of the engine for varying a passage length or a passage area of an intake passage for an intake manifold in response to an engine rotational speed. It should be noted that the variable intake device for the engine is structured so that, for example, when an engine rotational speed is in a low/intermediate rotational range, the variable intake valve switches an intake passage in such a way as to extend a passage length of the intake passage for the intake manifold or when the engine rotational speed in a high rotational range, the variable intake valve switches an intake passage in such a way as to shorten a passage length of the intake passage for the intake manifold. Thus, this device can improve engine output shaft torque (engine torque) regardless of an engine rotational speed. As to the fluid to be used, not only gas such as intake air or exhaust gas is used but also liquid such as water, oil or fuel may be used.

In the embodiment, the valve drive device for closing (or opening) the intake flow control valve 7 of the valve unit 4 is composed of an electric actuator equipped with a power unit including an electric motor and a power transmission mechanism (for example, gear reduction mechanism). However, the valve drive device for opening/closing valves may be composed of a vacuum operated actuator equipped with an electromagnetic or electric vacuum control valve or an electromagnetic actuator. In addition, valve-urging means such as a spring for urging valves in the valve-opening or closing direction may not be installed.

In the embodiment, the intake device for the internal combustion engine is mounted in an intake system (or exhaust system) of the engine with an in-line four-cylinder where cylinders are arranged in a group. However, the intake device for the internal combustion engine may be mounted in an intake system (or exhaust system) with a plurality of banks in each of which cylinders arranged in a group. Such engine includes a multi-cylinder engine such as a V-type engine, a horizontal type engine and a horizontally opposed engine. In the above embodiments, the first and second bearings 21 and 22 are resin-molded, but may be made of metallic material. In addition, the valve is not limited to a one-piece multi type valve, but may be a single cantilever valve so long as it is an intake control valve such as an intake flow quantity control valve, an intake flow control valve, an intake path switching valve or an intake path opening/closing valve.

Furthermore, the valve assembly may be incorporated into any suitable device for controlling flow of any fluid within the device.

In the embodiment, the head cover 2 (second valve assembly part) arranged downstream in the direction of intake air among the first and second engine parts which constitute the intake duct of the internal combustion engine, is a molded metal article such as aluminum die-cast, but the second engine part arranged downstream in the direction of air flow among the first and second engine parts which constitute the intake duct of the internal combustion engine may be the cylinder head 3, which may be a molded metal article such as aluminum die-cast. In this case, since energy from the engine is not directed greatly to the cylinder head 3 and the cylinder block, the head cover that attaches to the upper part of the cylinder head 3 may be formed of a light-weight material such as thermoplastic resin or magnesium.

In the embodiment, the first valve assembly part constituting the intake duct for the internal combustion engine is a dual-pipe structure intake manifold 1, but the first engine part may be a throttle body of a dual-pipe structure receiving a throttle valve therein. In this case, the second engine part constituting the intake duct of the internal combustion engine is a surge tank or intake manifold. Also, the first engine part constituting the intake duct of the internal combustion engine is a dual-pipe structure head cover. In this case, the second engine part constituting the intake manifold of the internal combustion engine is the cylinder head. Also, the intake manifold may be divided into a dual-pipe structure resin intake manifold and a metallic intake manifold. In this case, the dual-pipe structure resin intake manifold may be arranged at the upstream side or the downstream side in the direction of intake air in relation to the metallic intake manifold.

In the embodiments, the two female fitting parts (first fitting parts) 33, 34 are provided in the vicinity of the first coupling end surface 31 of the intake manifold (first engine part) 1, and the two male fitting parts (second fitting parts) 16, 17 are provided in the vicinity of the flange 15 of each of the housings 6 of each of the plurality of the valve units 4, where the two male fitting parts 16 and 17 fit respectively the female fitting parts 33, 34 of the intake manifold 1, but the two male fitting parts (first fitting parts) may be provided in the vicinity of the first coupling end surface 31 of the intake manifold 1, and the two female fitting parts (second fitting parts) fitting respectively the two female fitting parts 33, 34 of the intake manifold 1 may be provided in the vicinity of the flange 15 of each of the housings 6 of each of the plurality of the valve units 4. Furthermore, the two male fitting parts 16, 17 or the second fitting part such as the female fitting part may be arranged in a separate location from the flange 15 of the housing 6.

In the embodiment, the second fitting part such as the male fitting part 16 is provided at the outside wall surface of the top wall part 53 of each housing 6 of the plurality of the valve units 4, and the second fitting part such as the male fitting part 17 is provided at the outside wall surface of the bottom wall part 54 of each housing 6 of the plurality of the valve units 4, but the second fitting part such as the female fitting part or the male fitting part may be arranged at the outside wall surface of the first and second side wall parts 51 and 52 of each of the housings 6 of each of the plurality of valve units 4. In this case, the first fitting part such as the female fitting part 33, 34 of the intake manifold side or the male fitting part is arranged at the first and second side wall surfaces that oppose the outside wall surface of the first and second side wall parts 51, 52 of the housing 6 of the valve unit 4. Also, in regard to the number of parts of the first fitting part and the second fitting part, it is preferable that the opposing inside wall surface or the opposing section each has at least one part. Also, in the case where the fitting hole 21 of the intake manifold 1 is formed in a circular shape, and the cross sectional shape of the housing 6 of the valve unit 4 is formed in a cylindrical shape (circular pipe), it is preferable that at least two of the first fitting parts and the second fitting parts be arranged at regular intervals in the circumferential direction.

While only the selected example embodiments have been chosen to illustrate the present invention, it will be apparent to those skilled in the art from this disclosure that various changes and modifications can be made therein without departing from the scope of the invention as defined in the appended claims. Furthermore, the foregoing description of the example embodiments according to the present invention is provided for illustration only, and not for the purpose of limiting the invention as defined by the appended claims and their equivalents.

What is claimed is:

1. An intake device for an internal combustion engine comprising:
    a first and a second valve assembly parts that collectively define a duct;
    a valve unit that includes a housing defining a fluid flow path therethrough, wherein the valve unit is coupled to the first valve assembly part such that the fluid flow path is in fluid communication with the duct;
    a control valve for controlling flow of fluid in the flow path; and
    a gasket that seals a space between the first valve assembly part and the second valve assembly part, that seals a space between the first valve assembly part and the valve unit, and that dampens vibration transmitted to the valve unit,
    wherein the gasket includes an integral polymeric molded body.

2. An intake device for an internal combustion engine according to claim 1, wherein the gasket includes an annular elastic polymeric body that encompasses the valve unit and that comprises a first seal part that seals the space between the first valve assembly part and the second valve assembly part, and a second seal part that seals the space between the first valve assembly part and the valve unit.

3. An intake device for an internal combustion engine according to claim 2, wherein the gasket is constructed such that a compression ratio of the second seal part is lower than a compression ratio of the first seal part.

4. An intake device for an internal combustion engine according to claim 1, wherein the first valve assembly part includes a first coupling end surface which couples sealingly to an upstream end surface of the second valve assembly part via the gasket.

5. An intake device for an internal combustion engine according to claim 4, wherein:
    the first valve assembly part includes a control surface that faces downstream in relation to the direction of fluid flowing in the fluid flow path,
    the valve unit includes a contact surface that faces upstream in relation to the direction of fluid flowing in the fluid flow path, and
    the control surface and the contact surface abut each other.

6. An intake device for an internal combustion engine according to claim 5, wherein:
    the first valve assembly part includes a first fitting part;
    the valve unit includes a second fitting part;
    one of the first fitting part and the second fitting part is received in the other of the first fitting part and the second fitting part to thereby define an assembly position of the valve unit in a direction substantially perpendicular to an axis of the fluid flow path.

7. An intake device for an internal combustion engine according to claim 1, wherein:
    the control valve is pivotally coupled to the housing at a center of rotation; and
    the gasket encompasses the housing at a position spaced from the center of rotation along the axis of the flow path.

8. An intake device for an internal combustion engine according to claim 7, wherein the housing includes an inner pipe that defines the air flow path therein, and an outer pipe which encompasses the inner pipe such that a predetermined space is defined between the inner and outer pipes.

9. An intake device for an internal combustion engine according to claim 1, wherein:
    the first valve assembly part includes a manifold in which a first intake passage is defined;
    the second valve assembly part includes a cylinder head in which a second intake passage is defined, wherein flow direction of a fluid is such that the fluid flows in the first intake passage, then the fluid flow path, and then the second intake passage.

10. A valve assembly comprising:
    a first and a second valve assembly parts that collectively define a duct;
    a valve unit that includes a housing defining a fluid flow path therethrough, wherein the valve unit is coupled to the first valve assembly part such that the fluid flow path is in fluid communication with the duct;
    a control valve for controlling flow of fluid in the flow path; and
    a sealing member that seals a space between the first valve assembly part and the second valve assembly part, that seals a space between the first valve assembly part and the valve unit, and that dampens vibration transmitted to the valve unit,
    wherein the sealing member includes an integral polymeric molded body.

11. A valve assembly according to claim 10, wherein the sealing member includes an annular elastic polymeric body that encompasses the valve unit and that comprises a first seal part that seals the space between the first valve assembly part and the second valve assembly part, and a second seal part that seals the space between the first valve assembly part and the valve unit.

12. A valve assembly according to claim 11, wherein the sealing member is constructed such that a compression ratio of the second seal part is lower than a compression ratio of the first seal part.

13. A valve assembly according to claim 10, wherein the first valve assembly part includes a first coupling end surface which couples sealingly to an upstream end surface of the second valve assembly part via the sealing member.

14. A valve assembly according to claim 13, wherein:
    the first valve assembly part includes a control surface that faces downstream in relation to the direction of fluid flowing in the fluid flow path,
    the valve unit includes a contact surface that faces upstream in relation to the direction of fluid flowing in the fluid flow path, and
    the control surface and the contact surface abut each other.

15. A valve assembly according to claim 14, wherein:
    the first valve assembly part includes a first fitting part;
    the valve unit includes a second fitting part;
    one of the first fitting part and the second fitting part is received in the other of the first fitting part and the second fitting part to thereby define an assembly position of the valve unit in a direction substantially perpendicular to an axis of the fluid flow path.

16. A valve assembly according to claim 10, wherein:
the control valve is pivotally coupled to the housing at a center of rotation; and
the sealing member encompasses the housing at a position spaced from the center of rotation along the axis of the flow path.

17. A valve assembly according to claim 16, wherein the housing includes an inner pipe that defines the air flow path therein, and an outer pipe which encompasses the inner pipe such that a predetermined space is defined between the inner and outer pipes.

18. A valve assembly according to claim 10, wherein:
the first valve assembly part includes a manifold in which a first intake passage is defined;
the second valve assembly part includes a cylinder head in which a second intake passage is defined, wherein flow direction of a fluid is such that the fluid flows in the first intake passage, then the fluid flow path, and then the second intake passage.

\* \* \* \* \*